(12) United States Patent
Chang et al.

(10) Patent No.: US 11,126,292 B2
(45) Date of Patent: *Sep. 21, 2021

(54) ELECTRONIC APPARATUS WITH TOUCH PANEL AND METHOD FOR UPDATING TOUCH PANEL

(71) Applicant: Novatek Microelectronics Corp., Hsinchu (TW)

(72) Inventors: Hui-Hung Chang, Keelung (TW); Meng-Hsiu Wu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,845

(22) Filed: Oct. 31, 2018

(65) Prior Publication Data
US 2019/0073082 A1 Mar. 7, 2019

Related U.S. Application Data

(63) Continuation of application No. 15/712,148, filed on Sep. 22, 2017, now Pat. No. 10,146,369, which is a continuation-in-part of application No. 12/902,156, filed on Oct. 12, 2010, now Pat. No. 10,082,899.

(30) Foreign Application Priority Data

Aug. 19, 2010 (TW) .................................. 99127784

(51) Int. Cl.
*G06F 3/041* (2006.01)
*G06F 13/36* (2006.01)
*G06F 3/044* (2006.01)
*G06F 8/71* (2018.01)

(52) U.S. Cl.
CPC ............ *G06F 3/0416* (2013.01); *G06F 3/044* (2013.01); *G06F 8/71* (2013.01); *G06F 13/36* (2013.01)

(58) Field of Classification Search
CPC .... G06F 3/0236; G06F 3/0482; G06F 3/0304; G06F 2203/04804; G06F 2203/04803
See application file for complete search history.

(56) References Cited

U.S. PATENT DOCUMENTS

| 2004/0183787 A1* | 9/2004 | Geaghan | G06F 3/044 345/173 |
| 2007/0060290 A1* | 3/2007 | Watkins | G07F 17/32 463/19 |
| 2007/0109275 A1* | 5/2007 | Chuang | G06F 3/0488 345/173 |

(Continued)

FOREIGN PATENT DOCUMENTS

WO WO-2011155939 A1 * 12/2011 ............. G06F 21/83

*Primary Examiner* — Shaheda A Abdin
(74) *Attorney, Agent, or Firm* — JCIPRNET

(57) ABSTRACT

An electronic apparatus with a touch panel including a host controller, an interface unit, and a touch panel control unit is provided. The host controller is used to control an electronic apparatus implemented with the host controller. The touch panel control unit is coupled to the host controller through the interface unit. The host controller transmits an updating information to the touch panel control unit with a format of the interface unit, in which the updating data is used to update the touch panel control unit. The touch panel control unit decodes the updating data to accordingly update.

35 Claims, 10 Drawing Sheets

(56) References Cited

U.S. PATENT DOCUMENTS

| | | | | |
|---|---|---|---|---|
| 2008/0158177 A1* | 7/2008 | Wilson | ............... | G06F 3/04166 |
| | | | | 345/173 |
| 2009/0251727 A1* | 10/2009 | Yokomizo | ............. | G06F 9/4411 |
| | | | | 358/1.15 |
| 2009/0309871 A1* | 12/2009 | Elliott | ................... | G06F 3/1446 |
| | | | | 345/214 |
| 2011/0050618 A1* | 3/2011 | Murphy | ............. | G06F 3/04166 |
| | | | | 345/174 |
| 2011/0304583 A1* | 12/2011 | Kruglick | ................ | G06F 3/044 |
| | | | | 345/174 |

* cited by examiner

ELECTRONIC APPARATUS WITH TOUCH PANEL AND METHOD FOR UPDATING TOUCH PANEL

CROSS-REFERENCE TO RELATED APPLICATION

This application is a continuation application of and claims the priority benefit of a prior application Ser. No. 15/712,148, filed on Sep. 22, 2017, now allowed. The prior application Ser. No. 15/712,148 is a continuation-in-part application of and claims the priority benefit of a prior application Ser. No. 12/902,156, filed on Oct. 12, 2010, now patented as patent Ser. No. 10/082,899, which claims the priority benefit of Taiwan application serial no. 99127784, filed on Aug. 19, 2010. The entirety of each of the above-mentioned patent applications is hereby incorporated by reference herein and made a part of this specification.

BACKGROUND

1. Field of the Invention

The invention relates to an electronic apparatus with a touch panel. Particularly, the invention relates to a technique for updating a touch panel under an integrated apparatus state.

2. Description of Related Art

Touch devices, which are also referred to as touch panels, have been widely applied to various electronic apparatus in collaboration with a display technique, for example, in collaboration with functional options displayed by an image, an electronic apparatus can be operated through a touch panel. For example, a capacitive touch device is generally used in control systems such as digital cameras, navigators, E-readers, etc. Regarding the control system of the electronic apparatus, the capacitive touch device is only an auxiliary peripheral of the control system. A complete control system generally reserves a set of digital control interfaces for connecting the capacitive touch panel device. To ensure a correct operation of the complete control system, during normal production and verification processes, a production test tool inputs verified sensitivity parameters or a control flow information to the capacitive touch device though. Then, the production test tool reads sensing data of the capacitive touch device to confirm whether or not a single module of the capacitive touch device can correctly operate, and then the capacitive touch device is connected to the control system of the digital camera, the navigator or the E-reader, etc. for a whole assembling test, so as to complete a reliability test of a physical product.

Under such assembling structure, if it is found that the touch device is abnormal, the touch device has to be disassembled for testing and adjustment. Then, the touch device is re-assembled. Therefore, the touch device is not easy to be updated according to the conventional method.

SUMMARY OF THE INVENTION

The invention is directed to an electronic apparatus with a touch panel, under a condition of an integrated apparatus, if it is found that the touch panel is abnormal, related parameters or a control flow of the touch panel can be updated through an interface. Moreover, sensing data of the touch panel can be read and stored, so as to analyse the sensing data and update the related parameters or the control flow of the touch panel without disassembling the touch panel.

In an embodiment, the invention provides an electronic apparatus with a touch panel, capable of updating operation information of the touch panel, wherein the touch panel is allowed not to be detached from the electronic apparatus when an updating operation is performed. The electronic apparatus comprise a host controller, configured to control the electronic apparatus, but not to control the touch panel, wherein the host controller is configured to provide an updating data for correcting operation abnormality of the touch panel or for upgrading an operation flow of the touch panel. A memory unit is for storing operation information of the touch panel control unit. An interface unit is also included. A touch panel control unit is configured to be coupled to the host controller through the interface unit and receive the updating data. The touch panel control unit is configured to modify the operation information of the touch panel control unit stored in the memory unit according to the updating data.

In an embodiment, the invention provides a method for updating operation information of a touch panel, wherein the touch panel is allowed not to be detached from an electronic device integrated with the touch panel when the updating is performed. The method comprises obtaining an updating data, wherein the updating data has been received from a host controller by a touch panel control unit through an interface unit, wherein the updating data is for correcting operation abnormality of the touch panel or for upgrading an operation flow of the touch panel. Further, the updating data is converted by the touch panel control unit into a content required by the touch panel control unit. Operation information of the touch panel control unit stored in a memory unit is modified according to the updating data.

In an embodiment, the invention provides an electronic device for updating operation information of a touch panel for use in an electronic apparatus with a touch panel. The touch panel is allowed not to be detached from the electronic device when the updating is performed. The electronic device is configured to be coupled to a host controller configured to provide an updating data for correcting operation abnormality of the touch panel or for upgrading an operation flow of the touch panel. The electronic device comprises an interface unit; and a touch panel control unit, configured to be coupled to the host controller through the interface unit and configured to be accessing a memory unit, wherein the memory unit is configured to store operation information of the touch panel control unit. The touch panel control unit is configured to receive the updating data through the interface unit and modify the operation information of the touch panel control unit stored in the memory unit according to the updating data.

In an embodiment, the invention provides an electronic apparatus capable of updating operation information for a touch panel. The electronic apparatus comprises: a host controller, comprising a bus command control unit; a touch panel control unit, configured to access a memory unit for storing the operation information of the touch panel control unit; and an interface unit, configured to be coupled between the bus command control unit of the host controller and the touch panel control unit. The host controller is configured to receive an updating data and transmit the updating data to the touch panel control unit. The touch panel control unit is configured to transmit the updating data to update the operation information stored in the memory unit so as to update an internal operation of the touch panel control unit.

The updating data carries operation information of the touch panel control unit and is for correcting operation abnormality of the touch panel or for upgrading an operation flow of the touch panel.

In an embodiment, the invention provides a method for updating operation information of a touch panel, applicable to an electronic apparatus with the touch panel. The electronic apparatus comprises a touch panel control unit configured to be coupled to a host controller through an interface unit. The touch panel control unit is further configured to communicate with a memory unit for storing operation information of the touch panel. The method for updating operation information of the touch panel comprises obtaining an updating data by the touch panel control unit through the interface unit, wherein the updating data carries operation information of the touch panel control unit and is for correcting operation abnormality of the touch panel or for upgrading an operation flow of the touch panel; and updating the operation information of the touch panel control unit stored in the memory unit according to the updating data.

In an embodiment, the invention provides an electronic device capable of correcting operation abnormality of a touch panel or for upgrading an operation flow of the touch panel. The electronic comprises: an interface unit; and a touch panel control unit, configured to communicate with a memory unit for storing the operation information of the touch panel control unit. The touch panel control unit is configured to receive updating data through the interface unit and utilizing the updating data to update the operation information stored in the memory unit so as to update an internal operation of the touch panel control unit. The updating data carries operation information of the touch panel control unit and is for correcting operation abnormality of the touch panel or for upgrading an operation flow of the touch panel.

In an embodiment, the invention provides an electronic device for controlling a touch panel, capable of correcting operation abnormality of a touch panel or upgrading an operation flow of the touch panel. The electronic device comprises: an interface unit; and a touch panel control unit, coupled to the interface unit. The touch panel control unit is configured to receive an updating data through the interface unit. The updating data includes operation information of the touch panel control unit, and the touch panel control unit is configured to update the operation information of the touch panel control unit stored in a memory unit according to the updating data. The touch panel is allowed not to be detached from the electronic device when the updating is performed.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Regarding an electronic device with a touch panel, under a condition of integrated apparatus without disassembling, if the touch panel in abnormal condition is found, an operation information, such as touch-related parameters or a control flow, of the touch panel can be updated through an interface. Moreover, the sensing data of the touch panel can be read and stored, so as to analyse the sensing data and update the touch-related parameters or the control flow of the touch panel without disassembling the touch panel.

Embodiments are provided below to describe the technique of the invention, though the invention is not limited to the provided embodiments, and the embodiments can also be suitably combined to implement another embodiment.

Figure 1:
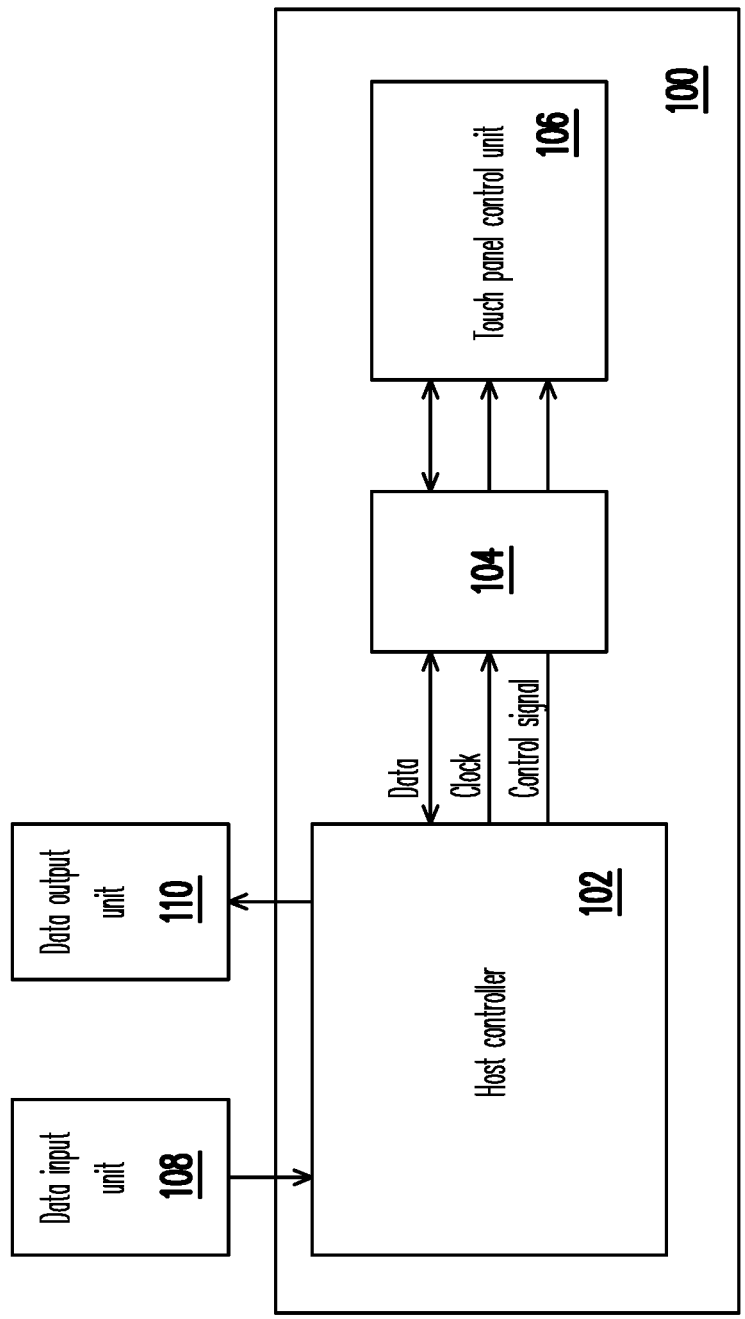
FIG. 1 is a schematic system block diagram of an electronic apparatus with a touch panel according to an embodiment of the invention.

FIG. 1 is a schematic system block diagram of an electronic apparatus with a touch panel according to an embodiment of the invention. Referring to FIG. 1, the electronic apparatus 100 is, for example, a digital camera, a mobile phone, a navigator, an E-reader or other electronic apparatus that can be operated through touch operations. A control system of the electronic apparatus 100 includes a host controller 102, an interface unit 104 and a touch panel control unit 106. The interface unit 104 is, for example, a bus of a serial interface or a parallel interface, which is used to connect the host controller 102 and the touch panel control unit 106 for signal transmission, such as transmission of data, clock and control signals. The interface unit 104 can be a serial interface of an inter-integrated circuit ($I^2C$), a serial peripheral interface (SPI), a universal asynchronous receiver/transmitter (UART), or a parallel interface defined by a general micro controller unit (MCU). The electronic apparatus 100 can also be connected to peripheral units such as a data input unit 108 and a data output unit 110. The host controller 102 controls functions of the electronic apparatus, and the touch panel control unit 106 controls operations of the touch panel.

Figure 2:
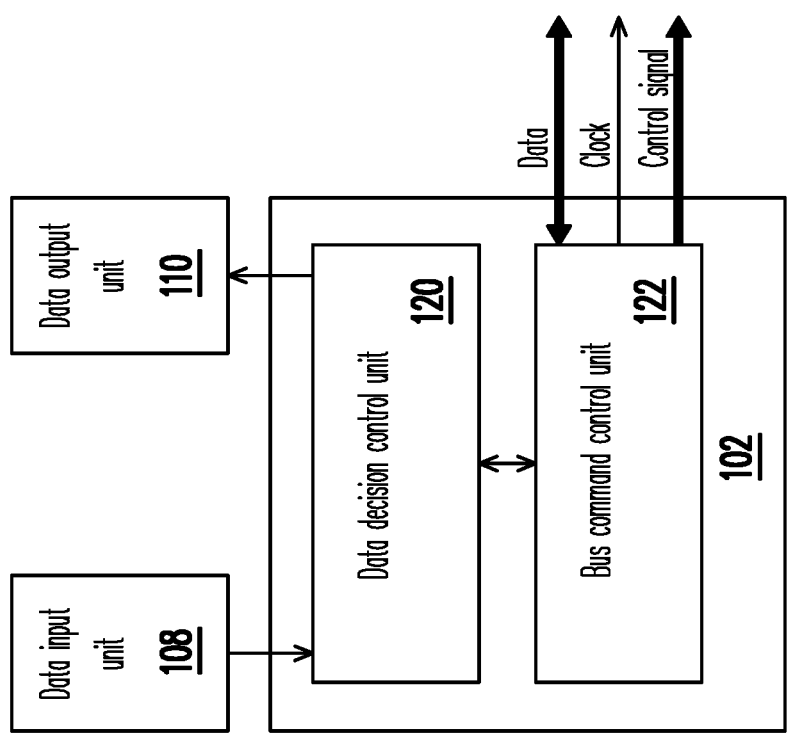
FIG. 2 is a functional block diagram of a host controller according to an embodiment of the invention.

FIG. 2 is a functional block diagram of a host controller according to an embodiment of the invention. Referring to FIG. 2, the host controller 102 includes a data decision control unit 120 and a bus command control unit 122. The data decision control unit 120 may read data from the data input unit 108, and transmits the data to the bus command control unit 122 after decision, and then the data is transmitted to the touch panel control unit 106 through the interface unit 104. Then, the data is, for example, further stored in a memory unit of touch parameters, for example, a memory unit 304, which is described later with reference of FIG. 4.

On the other hand, data transmitted from the touch panel control unit 106 can be received by the bus command control unit 122. For example, the bus command control unit 122 reads sensing data related to capacitive touch sensing from the touch panel control unit 106, and outputs the sensing data through the data output unit 110.

Figure 3:
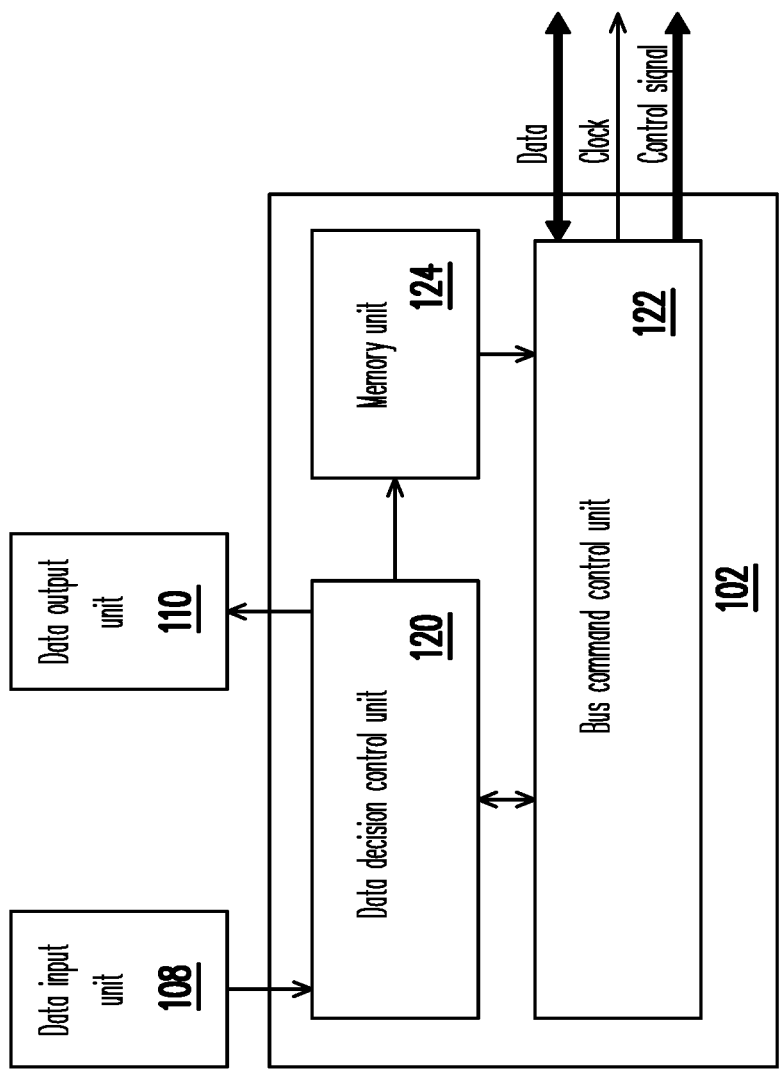
FIG. 3 is a functional block diagram of a host controller according to an embodiment of the invention.

The host controller 102 may also include other devices. FIG. 3 is a functional block diagram of a host controller according to an embodiment of the invention. Referring to FIG. 3, the host controller 102 may also include a memory unit 124. The data decision control unit 120 may read data from the data input unit 108, and store the data into the memory unit 124 after decision. The memory unit 124 is, for example, a flash memory. The bus command control unit 122 may directly read the stored data from the memory unit 124, and transmits the touch-related parameters to the memory unit 304 used for storing the touch-related parameters in the touch panel control unit 106 through the interface unit 104.

On the other hand, the data transmitted from the touch panel control unit 106 can be received by the bus command control unit 122. For example, the bus command control unit 122 reads sensing data related to capacitive touch sensing from the touch panel control unit 106, and outputs the sensing data through the data output unit 110.

Moreover, an operation relationship of the data decision control unit 120 and the bus command control unit 122 is still maintained, and the memory unit 124 can be used to store the decided data, so as to facilitate operations.

The data input unit 108 may include a data reading device, for example, a memory card. Executive program codes can be stored in the memory card, and the executive program codes can be loaded to the memory unit 124 by the data input unit 108 during a booting process, and can be transmitted to the touch panel control unit 106 through the interface unit 104.

Moreover, the memory unit 124 can also store the touch-related parameters of the touch panel, and the touch-related parameters of the touch panel can be transmitted to the touch panel control unit 106 through the interface unit 104. The touch panel control unit 106 may perform calculations by using the loaded information. During a testing stage, the memory unit 124 may also store related parameters of an accuracy test and a linearity test.

Figure 6:
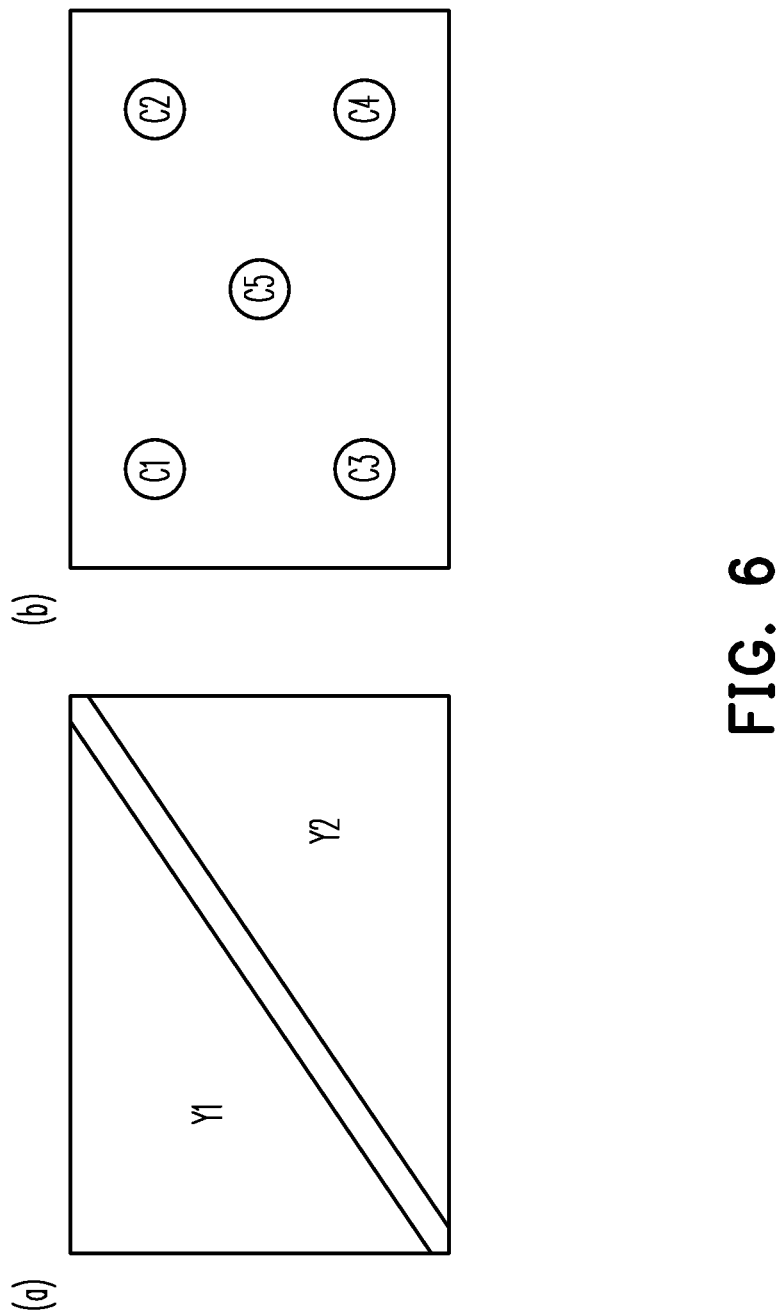
FIG. 6 is a schematic diagram of test reference data.

The accuracy test and the linearity test are described with reference of FIG. 6. FIG. 6 is a schematic diagram of test reference data. Referring to FIG. 6(a), regarding the linearity test, two linear boundaries $Y1=a*X1+b1$ and $Y2=a*X2+b2$ with an equivalent slope are defined for test setting. The touch sensing data corresponding to the test that is output by the touch panel control unit 106 can be compared to the linearity boundaries, to as to adjust the linearity thereof. Referring to FIG. 6(b), regarding the accuracy test, a plurality of circular boundaries C1-C5 with radiuses of Rn and center points of (Xn, Yn), wherein n=1–m are defined for test setting. Data of the linearity test and the accuracy test is shown in a following Table 1:

TABLE 1

| Parameter | Value |
| --- | --- |
| Firmware version | 1 |
| Software version | 2 |

TABLE 1-continued

| Parameter | Value |
| --- | --- |
| Y resolution | 360 |
| X resolution | 480 |
| . | . |
| . | . |
| . | . |

Figure 4:
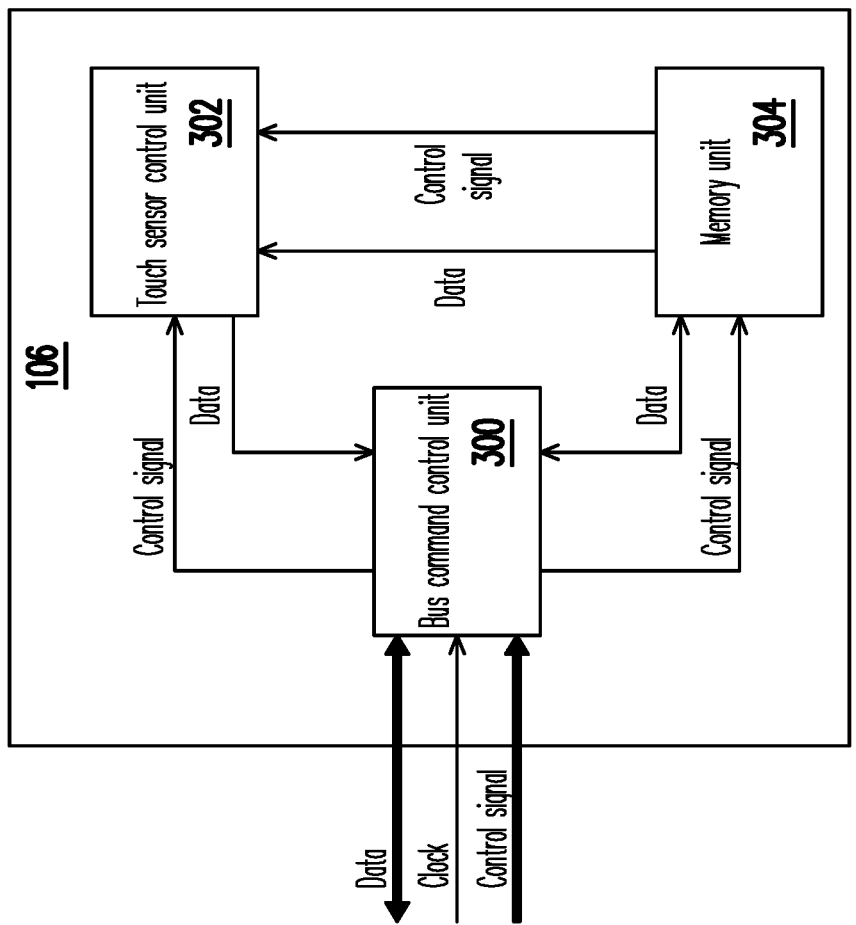
FIG. 4 is a functional block diagram of a touch panel control unit according to an embodiment of the invention.

A circuit structure of the touch panel control unit 106 is described in detail below. FIG. 4 is a functional block diagram of a touch panel control unit according to an embodiment of the invention. Referring to FIG. 4, the touch panel control unit 106 includes a bus command control unit 300, a touch sensor control unit 302 and the memory unit 304. The bus command control unit 300 communicates with the bus command control unit 122 of the host controller 102 through the interface unit 104. For example, the data received from the data input unit 108 can be written into the memory unit 304, so that the touch panel control unit 106 may obtain correct information such as touch parameters, etc. Moreover, the touch sensing data sensed by the touch sensor control unit 302 can be output to the data output unit 110 through the bus command control unit 300 and the bus command control unit 122 of the host controller 102 and the data decision control unit 120.

In the electronic apparatus with the touch panel of the present embodiment, when the operation information of the touch panel is required to be updated, the correct operation information is directly updated to and stored in the touch panel control unit 106 through the communication between the host controller 102 and the touch panel control unit 106. When the touch panel control unit 106 is tested, the tested touch sensing data can be output for analysing via the communication between the host controller 102 and the touch panel control unit 106. After the operation parameters are adjusted, the touch panel is updated through the communication between the host controller 102 and the touch panel control unit 106. In this way, updating and testing of the touch panel can be performed without disassembling the touch panel.

Figure 5:
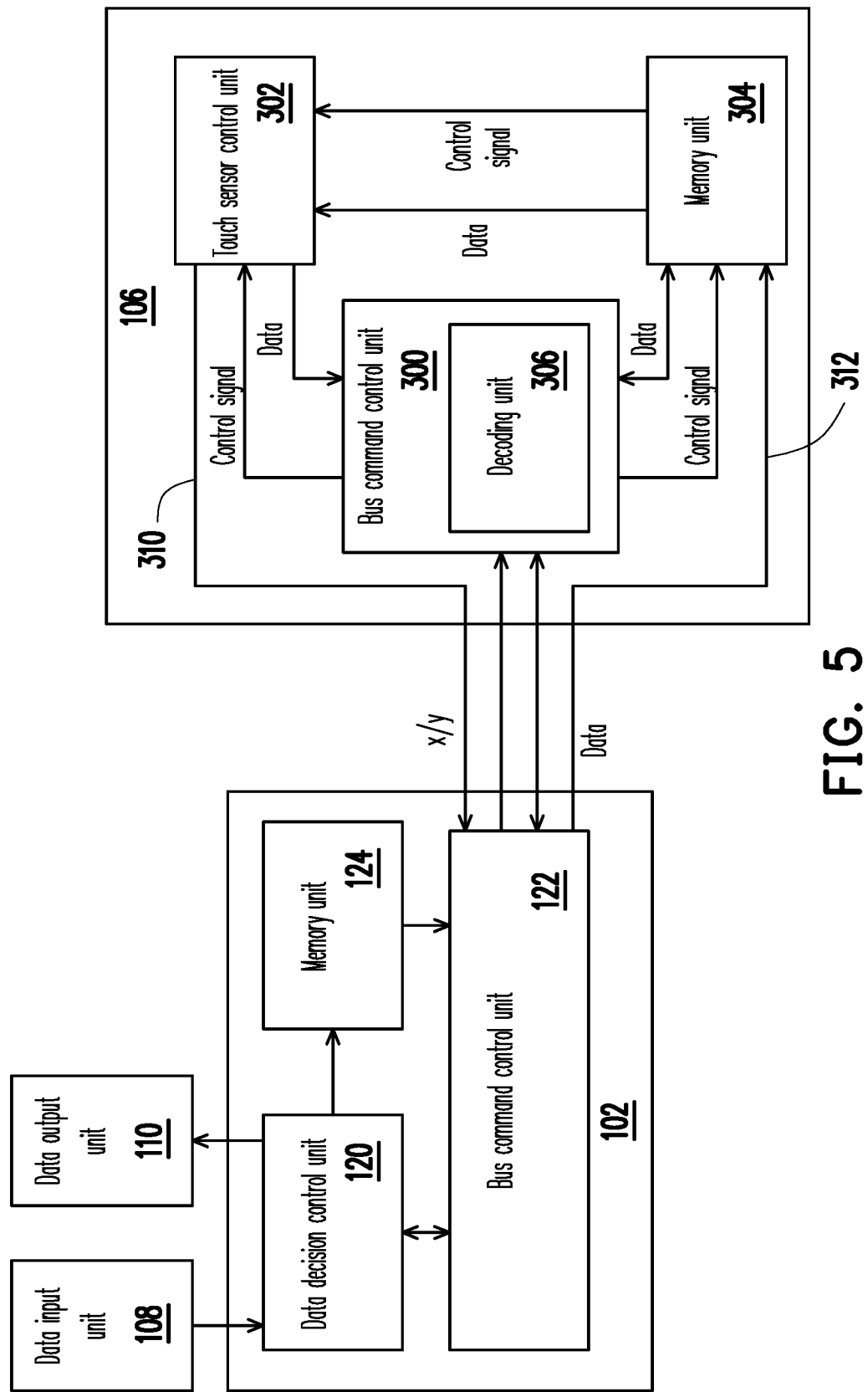
FIG. 5 is a schematic system block diagram of an electronic apparatus with a touch panel according to an embodiment of the invention.

A detailed embodiment is provided below for description. FIG. 5 is a schematic system block diagram of an electronic apparatus with a touch panel according to an embodiment of the invention. Referring to FIG. 5, a structure shown in FIG. 5 is the same to that of FIG. 4. In the present embodiment, the updating and testing operations performed through the communication between the host controller 102 and the touch panel control unit 106 are further described. The bus command control unit 300 may include a decoding unit 306, which is used for decoding operation commands and content used for updating.

The updating performed through an I2C interface is taken as an example. The host controller 102 loads updating data to any address of device addresses 124-127 of the I2C interface. When the touch panel control unit 106 receives an updating data 312 of such address through the decoding unit 306, the decoding unit 306 decodes the updating data and stores it to the memory unit 304.

When a user touches the touch panel, a coordinate data 310 is generated and transmitted through device addresses 1-123 of the I2C interface, and the touch panel control unit 106 transmits the coordinate data 310 of a touch point to the host controller 102. The decoding unit 306 of the bus command control unit 300 is an I2C protocol decoder, which is a slave device of the I2C interface. When the host controller 102 sends one of the device addresses 124-127 through the I2C protocol, and the data is complied with a format that can be recognized by the bus command control unit 300, the bus command control unit 300 outputs a control signal to drive the touch sensor control unit 302, so as to update the data provided by the host controller 102. When the host controller 102 sends one of the device addresses 1-123, the coordinate data 310 sensed by the touch sensor control unit 302 is transmitted back to the host controller 102. The memory unit 304 stores the updating data.

Figure 7:
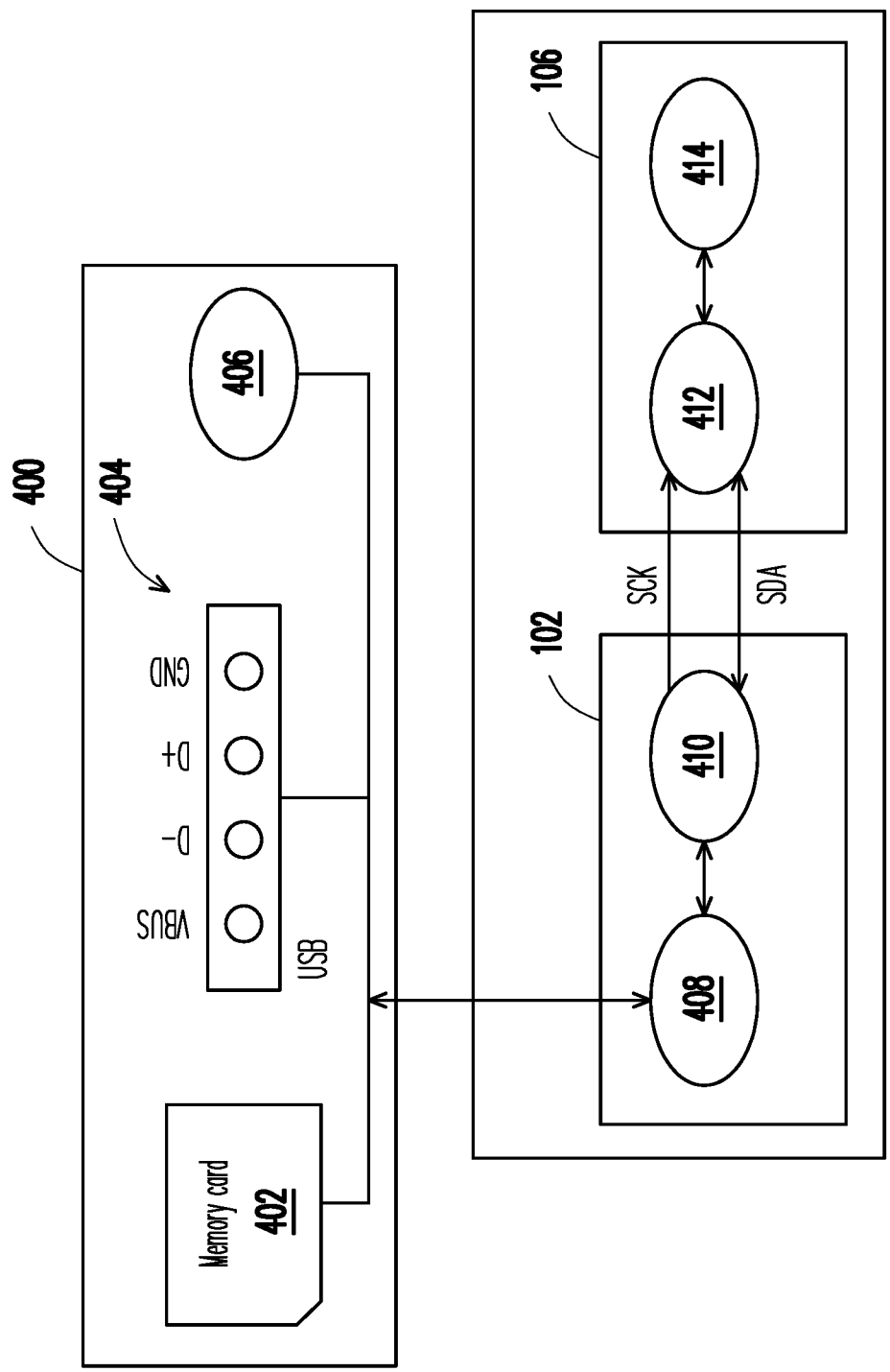
FIG. 7 is a diagram illustrating communication between a touch sensor control unit and a memory unit according to an embodiment of the invention.

FIG. 7 is a diagram illustrating communication between the touch sensor control unit 302 and the memory unit 304 according to an embodiment of the invention. Referring to FIG. 7, implementation of a data input unit 400 is not limited by the invention, which can be a memory card 402, a USB device 404 or any interface 406. The updating data is transmitted to the host controller 102. The host controller 102 is, for example, a DSC controller, which includes a binary code decoder 408 and an I2C protocol controller 410, and can transmit a clock signal (SCK) and a data signal (SDA) to the touch panel control unit 106 for communication. The touch panel control unit 106, for example, includes a read/write arbiter 412 and a memory unit 414. The read/write arbiter 412 may update the updating data to the memory unit 414.

According to an I2C data format, data of 8 bytes is taken as a unit. According to the I2C data format, the device addresses are first recorded, and then a start address or state data is recorded. Different commands corresponding to the updating flow are transmitted according to the I2C data format.

Figure 8:
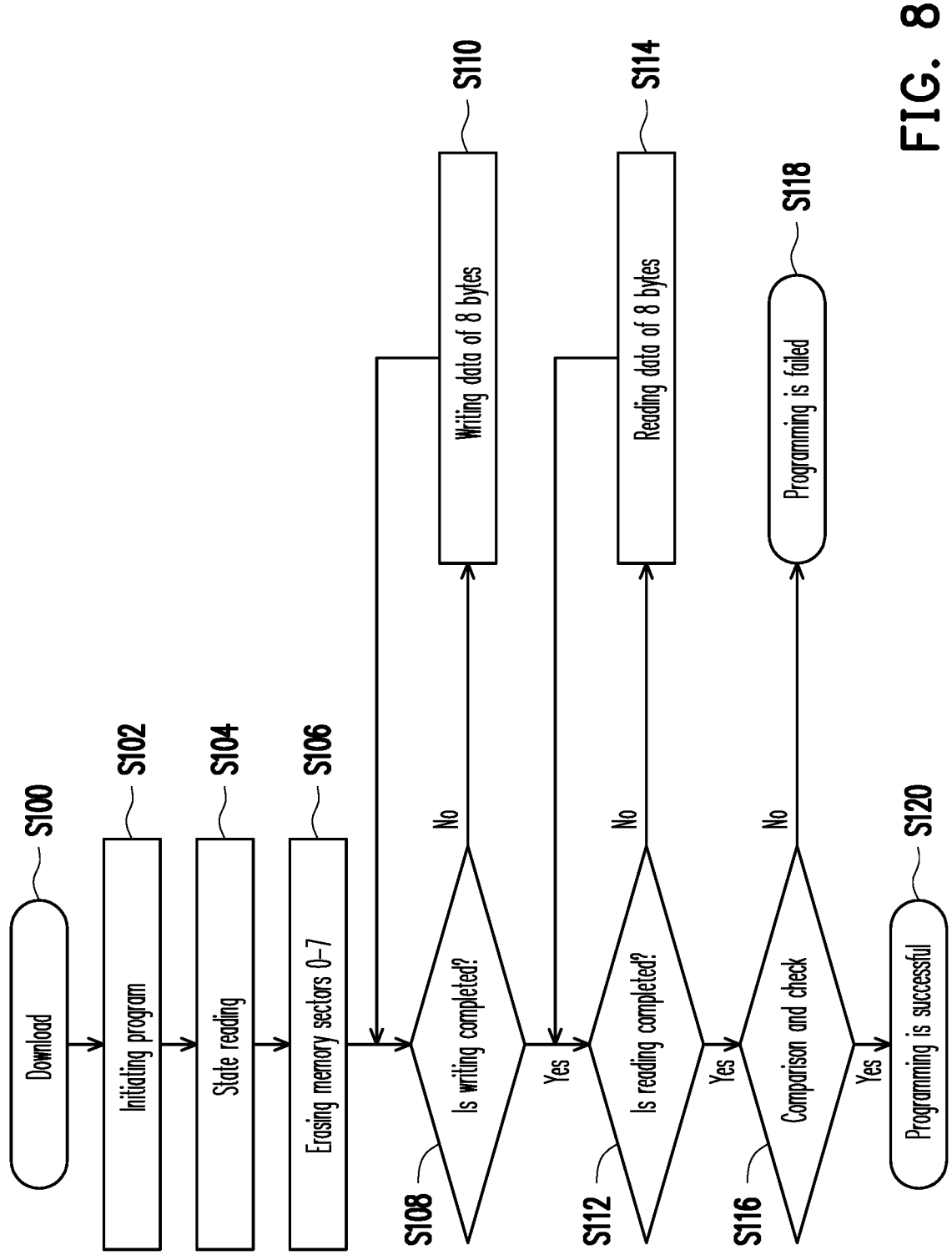
FIG. 8 is a schematic diagram illustrating an updating flow according to an embodiment of the invention.

FIG. 8 is a schematic diagram illustrating an updating flow according to an embodiment of the invention. Referring to FIG. 8, in step S100, file download is performed. In step S102, a program operation is initiated, i.e. a memory write operation is initiated. In step S104, state reading is performed. In step S106, memory sectors 0-7 are erased. The memory is a flash memory, for example. In step S108, it is determined whether writing of the updating data is completed. If writing of the updating data is not completed, in step S110, data of 8 bytes is written, and the step S108 is repeated. If the writing of the updating data is completed, in step S112, it is determined whether a read operation is completed. If the read operation is not completed, in step S114, data of 8 bytes is read, and the step S112 is repeated. If the read operation is completed, in step S116, check and comparison are performed. In other words, the updating data is first written and then read out, so as to check consistency of the data. If the data is not consistent, in step S118, it is responded that the program operation is failed, i.e. the updating operation is failed. If the data is consistent, a step S120 is executed, by which it is responded that the program operation is successful, i.e. the updating operation is successful.

According to another aspect, the invention provides a control program, and under a condition of an integrated apparatus state, an input/output interface of the integrated apparatus is connected to a capacitive touch device, so as to update the parameters and the control program of the capacitive touch device, and read real-time sensing data of the capacitive touch device.

Further, the input/output interface of the integrated apparatus may include various cable, wireless, serial or parallel transmission interfaces.

The integrated apparatus is, for example, a control system such as a digital camera, a navigator, an E-reader or an active or passive device such as an audio/video electronic product, a computer, a computer peripheral 3C, or an automatic teller machine, etc.

A transmission direction of communication includes a simplex, a half duplex, or a full-duplex transmission direction.

Further, the parameters of the capacitive touch device may include a system information, sensitivity of the capacitive touch device, a gesture data format and a control flow of the touch panel, so that ideal information can be updated to the capacitive touch device under the condition of the integrated apparatus state.

As noted, the control flow is firmware for controlling the operation of the functional circuit block in the touch panel. The content of the control flow, like an operation program, is not changed during a displaying event or detecting a touch event, which can be the actual touch event or the test event for calibrating touch coordinate. In other words, the control flow is to control an operation of circuit blocks of the touch panel, a content of the control flow is a firmware including no touch sensing data from detecting a touch event and is not changed during the touch event or displaying image.

Remarkably, when a display panel is displaying dynamic images, the image content is changed with time but the displaying control flow (firmware) is not changed. Likewise, when the touch panel is detecting the touch event, the content of the touch even detection is changed but the control flow is not changed.

In the invention, the control flow of firmware is updated by host controller of the electronic apparatus.

Moreover, the real-time sensing data of the capacitive touch device includes software version and touch sensing data of the capacitive touch device, so that a sensing state of the capacitive touch device can be read and analysed by an external device under the condition of the integrated apparatus state.

Figure 9:
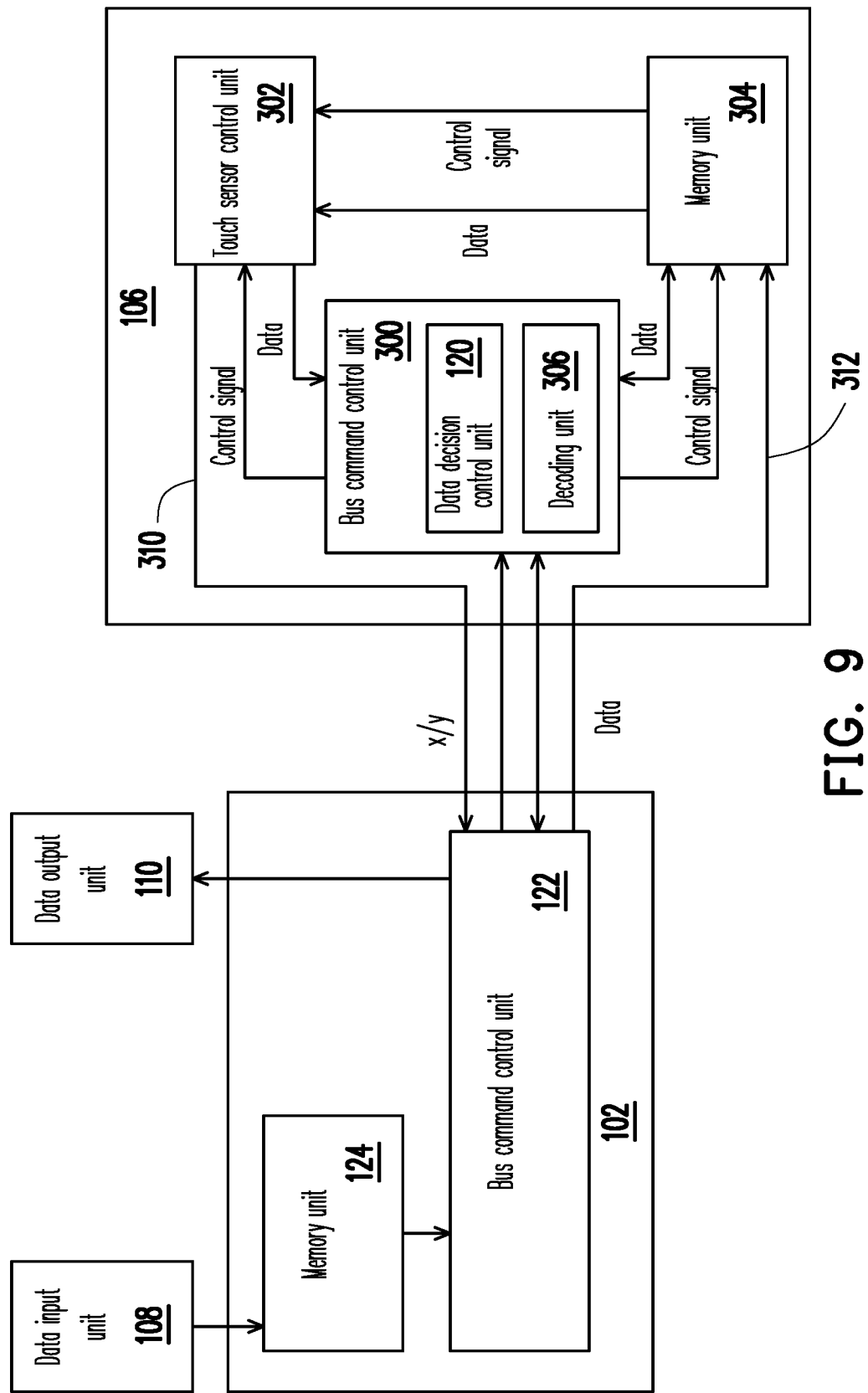
FIG. 9 is a schematic system block diagram of an electronic apparatus with a touch panel according to an embodiment of the invention.

Under the same technical concept, the data decision control unit 120 of FIG. 5 is not necessarily to be implemented in the host controller 102. FIG. 9 is a schematic system block diagram of an electronic apparatus with a touch panel according to an embodiment of the invention. Referring to FIG. 9, in another implementation of the system structure, the data decision control unit 120 of the host controller 102 of FIG. 5 can be implemented in the bus command control unit 300 of the touch panel control unit 106. For the operation, the data decision control unit 120 and the decoding unit 306 can operate together in integration or operate separately, to decode out the updating data. The internal touch panel control unit 106 can be implemented by hardware or firmware to achieve a data decision function. In an actual application, during a program updating process, program source codes can be directly input to the memory unit 124 through the data input unit 108. The data decision control unit 120 within the bus command control unit 300 encodes the program codes into a required format, and executes the program updating flow, so as to implement the function of updating the program codes. For the external user, the flow of updating the program codes is quite simple.

Figure 10:
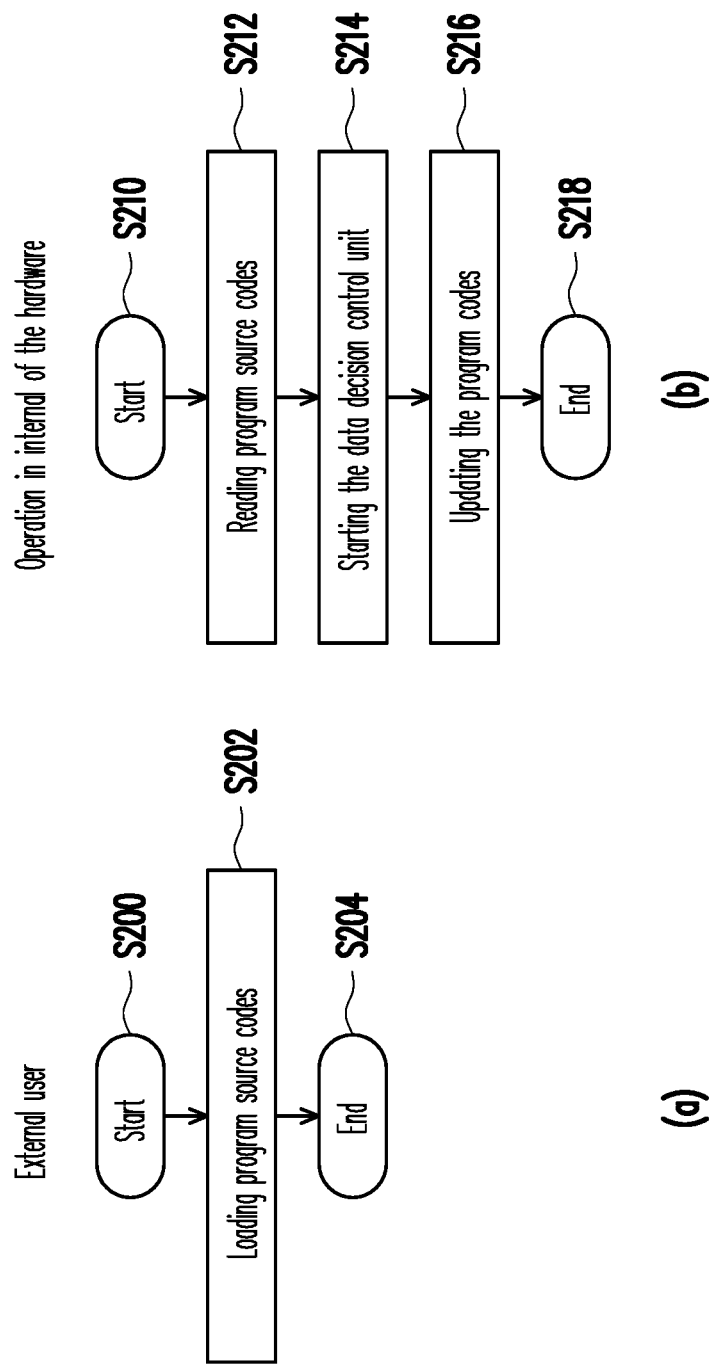
FIG. 10 is a schematic diagram illustrating an updating flow according to an embodiment of the invention.

FIG. 10 is a schematic diagram illustrating an updating flow according to an embodiment of the invention. Referring to FIG. 10(a), for the external user, in step S200, the updating flow is initiated. In step S202, the program source codes are loaded. In step S204, the updating flow is ended. Referring to FIG. 10(b), for the internal operation of the hardware, in step S210, updating of the program codes is started. In step S212, the program source codes are read. In step S214, the data decision control unit decides the program source codes into a required format. In step S216, the program codes are updated according to the decided program source codes. In step S218, the updating is ended.

In other words, in the present embodiment, the hardware structure of the host controller 102 is further simplified, and the updating data is only required to be transmitted to the touch panel control unit 106, and the updating operation can be completed within the touch panel control unit 106, so that the updating operation at the user's end is also simplified.

It will be apparent to those skilled in the art that various modifications and variations can be made to the structure of the invention without departing from the scope or spirit of the invention. In view of the foregoing, it is intended that the invention covers modifications and variations of this invention provided if they fall within the scope of the following claims and their equivalents.

What is claimed is:

1. An electronic apparatus with a touch panel, capable of updating operation information of the touch panel, wherein the touch panel is allowed not to be detached from the electronic apparatus when an updating operation is performed, the electronic apparatus comprising:
   a host controller, located inside the electronic apparatus and is configured to control the electronic apparatus, but not to control the touch panel, wherein the host controller is configured to provide an updating data for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus;
   a memory unit for storing operation information of a touch panel control unit;
   an interface unit; and
   the touch panel control unit, configured to be coupled to the host controller through the interface unit and receive the updating data,
   wherein the touch panel control unit is configured to modify the operation information of the touch panel control unit stored in the memory unit according to the updating data.

2. The electronic apparatus as claimed in claim 1, wherein the updating data carries the operation information of the touch panel control unit and includes a control flow of the touch panel control unit.

3. The electronic apparatus as claimed in claim 1, wherein the control flow is to control an operation of circuit blocks of the touch panel, and a content of the control flow includes no touch sensing data from detecting a touch event and is not changed during the touch event.

4. The electronic apparatus as claimed in claim 1, wherein the touch panel control unit is configured to decode the updating data, which has been encoded into an inputting format, into a content required by the touch panel control unit.

5. The electronic apparatus as claimed in claim 1, wherein the operation information comprises updated parameters of a test stage.

6. The electronic apparatus as claimed in claim 5, wherein the parameters of the test stage comprise parameters of at least one of an accuracy test and a linearity test.

7. The electronic apparatus as claimed in claim 1, wherein the operation information comprises a plurality of parameters for touch controlling.

8. The electronic apparatus as claimed in claim 7, wherein the plurality of parameters for touch controlling include at least one of system information, sensitivity for touch controlling, a gesture data format, and a control flow for touch controlling.

9. The electronic apparatus as claimed in claim 1, wherein the memory unit is implemented in the touch panel.

10. A method for updating operation information of a touch panel of an electronic apparatus, wherein the touch panel is allowed not to be detached from an electronic device integrated with the touch panel when the updating is performed, the method comprising:
    obtaining an updating data, wherein the updating data has been received from a host controller by a touch panel control unit through an interface unit, wherein the host controller is located inside the electronic apparatus, and the updating data is for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus;
    converting the updating data by the touch panel control unit into a content required by the touch panel control unit; and
    modifying operation information of the touch panel control unit stored in a memory unit according to the updating data.

11. The method as claimed in claim 10, wherein the updating data carries the operation information of the touch panel control unit and includes a control flow of the touch panel control unit.

12. The method as claimed in claim 10, wherein the control flow is to control an operation of circuit blocks of the touch panel, and a content of the control flow includes no touch sensing data from detecting a touch event and is not changed during the touch event.

13. The method as claimed in claim 10, wherein the step of converting comprises decoding the updating data, which has been encoded into an inputting format, into the content required by the touch panel control unit.

14. The method as claimed in claim 10, wherein the operation information comprises updated parameters of a test stage.

15. The method as claimed in claim 14, wherein the parameters of the test stage comprise parameters of at least one of an accuracy test and a linearity test.

16. The method as claimed in claim 10, wherein the operation information comprises a plurality of parameters for touch controlling.

17. The method as claimed in claim 16, wherein the plurality of parameters for touch controlling include at least one of system information, sensitivity for touch controlling, a gesture data format, and a control flow for touch controlling.

18. The method as claimed in claim 10, wherein the memory unit is implemented in the touch panel.

19. An electronic device for updating operation information of a touch panel for use in an electronic apparatus with a touch panel, wherein the touch panel is allowed not to be detached from the electronic device when the updating is performed, and the electronic device is configured to be coupled to a host controller located inside the electronic apparatus and configured to provide an updating data for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus, the electronic device comprising:
- an interface unit; and
- a touch panel control unit, configured to be coupled to the host controller through the interface unit and configured to be accessing a memory unit, wherein the memory unit is configured to store operation information of the touch panel control unit,
- wherein the touch panel control unit is configured to receive the updating data through the interface unit and modify the operation information of the touch panel control unit stored in the memory unit according to the updating data.

20. The electronic device as claimed in claim 19, wherein the updating data carries the operation information of the touch panel control unit and includes a control flow of the touch panel control unit.

21. The electronic device as claimed in claim 19, wherein the control flow is to control an operation of circuit blocks of the touch panel, and a content of the control flow includes no touch sensing data from detecting a touch event and is not changed during the touch event.

22. The electronic device as claimed in claim 19, wherein the touch panel control unit is configured to decode the updating data, which has been encoded into an inputting format, into a content required by the touch panel control unit.

23. The electronic device as claimed in claim 19, wherein the operation information comprises updated parameters of a test stage.

24. The electronic device as claimed in claim 23, wherein the parameters of the test stage comprise parameters of at least one of an accuracy test and a linearity test.

25. The electronic device as claimed in claim 19, wherein the operation information comprises a plurality of parameters for touch controlling.

26. The electronic device as claimed in claim 25, wherein the plurality of parameters for touch controlling include at least one of system information, sensitivity for touch controlling, a gesture data format, and a control flow for touch controlling.

27. The electronic device as claimed in claim 19, wherein the memory unit is implemented in the touch panel.

28. An electronic apparatus capable of updating operation information for a touch panel, comprising:
- a host controller, located inside the electronic apparatus, comprising a bus command control unit;
- a touch panel control unit, configured to access a memory unit or storing the operation information of the touch panel control unit; and
- an interface unit, configured to be coupled between the bus command control unit of the host controller and the touch panel control unit,
- wherein the host controller is configured to receive an updating data and transmit the updating data to the touch panel control unit, and the touch panel control unit is configured to transmit the updating data to update the operation information stored in the memory unit so as to update an internal operation of the touch panel control unit, wherein the updating data carries operation information of the touch panel control unit and is for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus.

29. The electronic apparatus as claimed in claim 28, wherein the memory unit is implemented in the touch panel.

30. A method for updating operation information of a touch panel, applicable to an electronic apparatus with the touch panel, wherein the electronic apparatus comprises a touch panel control unit configured to be coupled to a host controller located inside the electronic apparatus through an interface unit, and the touch panel control unit is further configured to communicate with a memory unit for storing operation information of the touch panel, and the method for updating operation information of the touch panel comprising:
- obtaining an updating data by the touch panel control unit through the interface unit, wherein the updating data carries operation information of the touch panel control unit and is for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus; and
- updating the operation information of the touch panel control unit stored in the memory unit according to the updating data.

31. The method as claimed in claim 30, wherein the memory unit is implemented in the touch panel.

32. An electronic device capable of correcting operation abnormality of a touch panel or for upgrading an operation flow of the touch panel, comprising:
- an interface unit; and
- a touch panel control unit, configured to communicate with a memory unit for storing the operation information of the touch panel control unit;
- wherein the touch panel control unit is configured to receive updating data through the interface unit and utilizing the updating data to update the operation information stored in the memory unit so as to update an internal operation of the touch panel control unit, wherein the updating data carries operation information of the touch panel control unit and is for correcting operation abnormality of the touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus.

33. The electronic device as claimed in claim 32, wherein the memory unit is implemented in the touch panel.

34. An electronic device for controlling a touch panel, capable of correcting operation abnormality of a touch panel detected during an assembling test by upgrading an operation flow or touch-related parameters of the touch panel, wherein the assembling test is configured to test an operation of the touch panel in an integrated apparatus that is formed by assembling the touch panel to the electronic apparatus, comprising:
- an interface unit; and
- a touch panel control unit, coupled to the interface unit, wherein the touch panel control unit is configured to receive an updating data through the interface unit, wherein the updating data includes operation information of the touch panel control unit, and the touch panel control unit is configured to update the operation information of the touch panel control unit stored in a memory unit according to the updating data, and wherein the touch panel is allowed not to be detached from the electronic device when the updating is performed.

35. The electronic device as claimed in claim 34, wherein the memory unit is implemented in the touch panel.

\* \* \* \* \*